Aug. 13, 1929.  G. C. GREEN  1,724,083
ADJUSTABLE SUPPORT FOR HEADLIGHTS
Filed Jan. 5, 1928
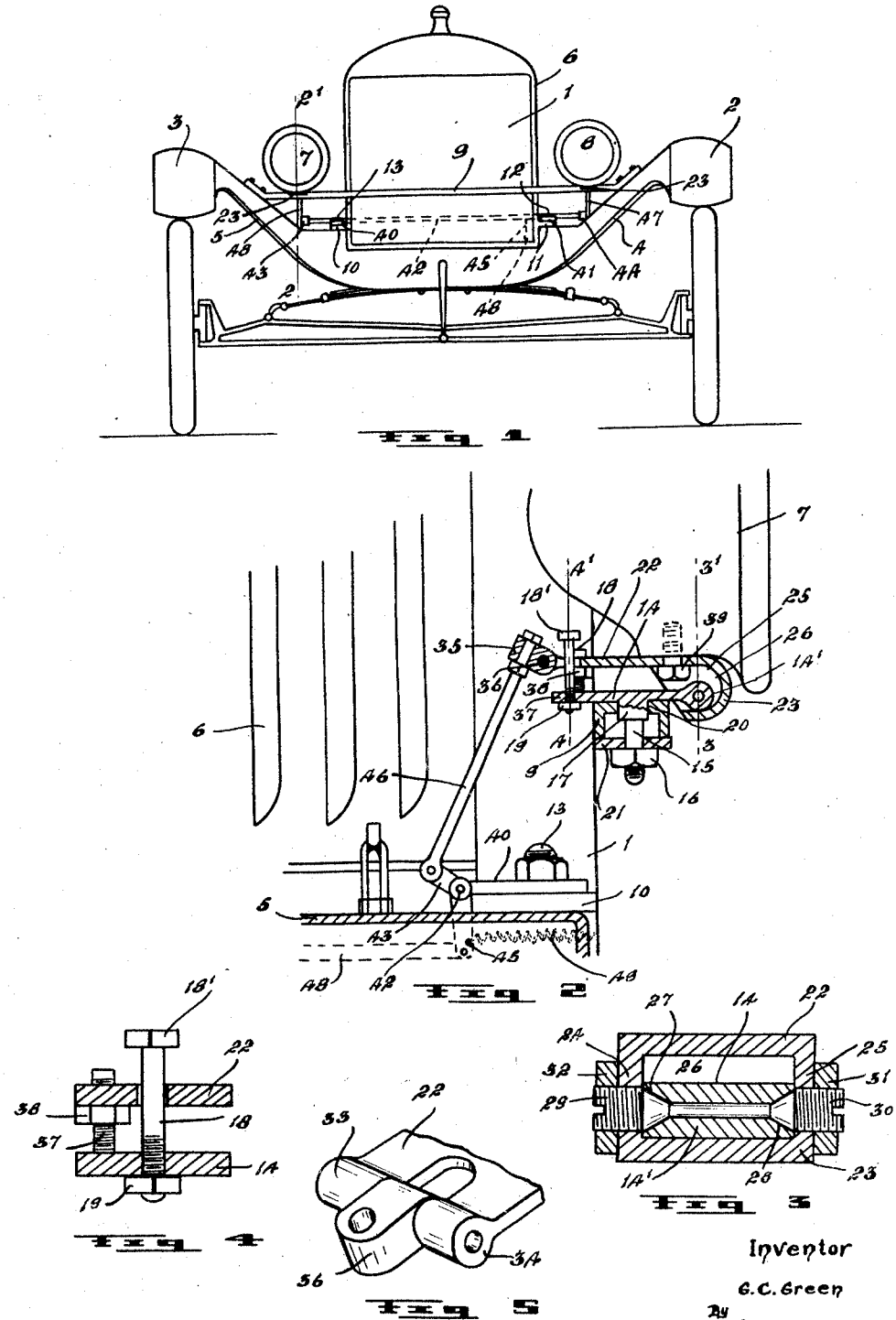
Inventor
G. C. Green Patented Aug. 13, 1929.

1,724,083

UNITED STATES PATENT OFFICE.

GORDON C. GREEN, OF SWIFT CURRENT, SASKATCHEWAN, CANADA.

ADJUSTABLE SUPPORT FOR HEADLIGHTS.

Application filed January 5, 1928, Serial No. 244,717, and in Canada March 1, 1927.

The invention relates to improvements in adjustable supports for headlights and an object of the invention is to provide a device which can be readily installed on an automobile, truck or such like and which will permit the driver to tilt his headlights groundward when desired, such as when approaching another vehicle on the road and in so doing avoid the undesirable glare which so often causes accident.

A further object is to construct the device in a simple, durable and inexpensive manner and such that both headlights are simultaneously tilted and further to arrange the device so that the headlights are held under pressure in a normal driving position.

A further object is to construct the device so that any loose play in the hinge joint of the support can be readily taken up, such also insuring that there will be no flicker of the light due to improper grounding of the one side of the light circuit.

A further object of the invention is to construct the device so that the amount of tilt can be readily adjusted by the user, also such that the headlight can be readily adjusted for normal road conditions.

With the above more important objects in view, the invention consists essentially in the arrangement and construction of parts hereinafter more particularly described, reference being had to the accompanying drawing, in which:—

Fig. 1 is a front view of an automobile equipped with my invention.

Fig. 2 is an enlarged detailed vertical sectional view at 2—2′ Figure 1, the headlight and certain other parts being shown in side elevation.

Fig. 3 is a vertical sectional view at 3—3′ Figure 2.

Fig. 4 is a vertical sectional view at 4—4′ Figure 2.

Fig. 5 is a perspective view of the rear end of the top hinged plate.

In the drawing like characters of reference indicate corresponding parts in the several figures.

The automobile presents the customary radiator 1, fenders 2 and 3, fender guards 4 and 5, an engine hood 6, headlights 7 and 8 and headlight supporting bar 9 carried by the guards together with other well known parts herein shown but not herein described.

The radiator is provided at the sides with attaching lugs 10 and 11 and bolts 12 and 13 pass through these lugs and fasten the radiator to the chassis. The bar 9 has the ends thereof permanently fastened to the fender guards and it extends horizontally in front of the radiator. Customarily the headlights 7 and 8 are permanently fastened to the bar 9 so that they cannot be shifted to tilt the lights groundward. According to my invention, I provide a special support for each headlight and a connection between the supports together with an operating appliance and such permits me to simultaneously tilt the headlights groundward when desired and thereby prevent glare as at present occurs when automobiles are approaching one another. As the supports are identically constructed, the description of one will suffice.

The support comprises a base plate 14 which is provided centrally with a downwardly extending stud 15, the lower end of which is screw threaded to receive a nut 16 and the upper end of which is enlarged to provide a bearing head 17. The forward end of the plate terminates in a bearing sleeve 14′ of the full width of the plate and the rear end thereof is centrally apertured and screw threaded to receive the lower end of a vertically disposed adjusting bolt 18. A lock nut 19 is supplied on the lower end of the bolt. The bar 9 is provided in the location where the headlight is mounted with an aperture 20 which rotatably receives the head 17 and the base plate is fastened to the bar by applying a washer 21 on the bolt and subsequently tightening up the nut 16.

To the forward end of the stationary plate or wing 14, I pivotally connect an upper plate or wing 22 which has the forward end thereof curved downwardly in a semicircular manner to provide a guard 23 and integrally cast end walls 24 and 25 which close the ends of the pocket 26 formed by the down turned guard. The bearing sleeve 14′ enters the pocket 26 between the end walls 24 and 25 and by observing Figure 3, it will be seen that the ends of the bearing sleeve terminate in cone shaped seats 27 and 28. These seats receive the coned ends of adjusting screws 29 and 30 which are screw threaded through the end walls and have their outer ends provided with lock nuts 31 and 32. The screws 29 and 30 form pivots which pivotally connect the wing 22 to the wing or plate 14. By providing a pivot bearing of this nature, one can readily take up any slack which may occur from time to time in the bearing.

The rear end of the wing 22 is forked and is provided with two aligned eyes 33 and 34 and between the eyes I locate a lug 35 which is pivotally mounted on a cross pin 36 carried by the eyes. The bolt 18 passes upwardly through the fork in the plate 22 and has the head 18' thereof thereabove. Obviously the head 18' will limit the up movement of the wing 22. The down movement of the wing is limited by an adjusting screw 37 screw threaded through the rear end of such plate and engaging with the upper face of the plate 14. A lock nut 38 is provided on the latter screw to retain it in any set position.

The headlight is fastened to the plate 22 by a jam screw 39 which passes through the plate and screws into the base of the headlight. According to the above, it will be obvious that the headlights can be tilted in the vertical plane an amount limited by the adjustment given the adjusting bolt 18 and the screw 37. Means is provided for simultaneously swinging the plates 22 and such is now described.

The bolts fastening the radiator lugs to the car frame are utilized also to fasten similar bearing plates 40 and 41 and the rear ends of these plates carry rotatably a cross rod 42 which is provided at the ends with rearwardly extending cranks 43 and 44 and also with a downwardly extending crank 45. Similar connecting rods 46 and 47 extend between the cranks 43 and 44 and the pivoted lugs 35 of the plates 22, these rods being permanently connected to the lugs and pivotally connected to the cranks. An operating rod 48 is pivotally connected to the forward end of the crank 45 and this rod can be controlled in any convenient manner by the attendant on the car.

As the particular manner in which the rod 48 is operated forms no part of the present invention, the same is not herein described but it is pointed out that the rod requires to be releasably held in a set forward position in order that the plates 22 will not shift under normal driving conditions. I have herein shown a spring 49 attached to the crank 45 and a suitable part of the frame, this spring serving to pull said crank ahead and accordingly acting to hold both plates 22 down. Obviously upon the rod 48 being manually pulled back, the plates 22 will simultaneously rise and the headlights will accordingly be tilted groundward. As soon as the rod 48 is released, the spring will act to return the headlights to their normal position.

In setting this device, the screws 37 will be adjusted so that the light beams emanating from the headlight will be as permitted by existing bylaws. The bolts 18 will be adjusted as the car owner desires, as they simply limit the amount of tilt which can be given the headlights. With this device applied on an automobile, one can when approaching another automobile tilt his headlights a greater or less amount so that the approaching driver will not in any way be blinded by the headlight glare as will be readily understood.

What I claim as my invention is:—

1. The combination with a supporting bar and a pair of headlights, of a support for each headlight embodying a hinge, one wing of which is secured to the headlight and the other of which is fastened to the bar, said support permitting of the tilting of the headlights groundward, adjustable means limiting the up and down movement of the headlight carrying wings, means normally retaining the headlight carrying wings in their down positions and manually operated means for simultaneously raising the latter wings to tilt the headlights groundward.

2. The combination with a supporting bar and a pair of headlights, of a two-winged hinge for each headlight having the under wing fastened to the bar and the upper movable wing fastened to the headlight, adjustable means carried by the upper wing and engageable with the lower wing and limiting the down swung position of the upper wing, an adjustable member carried by the under wing and limiting the up swing of the upper wing, means yieldingly holding the upper wings in their down swung position and manually operated means for simultaneously swinging the upper wings upwardly to tilt the headlights.

3. The combination with a supporting bar and a pair of headlights, of a two-winged hinge for each headlight having the under wing fastened to the bar and the upper movable wing fastened to the headlight, adjustable means carried by the upper wing and engageable with the lower wing and limiting the down swung position of the upper wing, an adjustable member carried by the under wing and limiting the up swing of the upper wing, means yieldingly holding the upper wings in their down swung position, a rotatably mounted cross rod, cranks carried thereby, connecting rods connecting the cranks with the upper wings and manually operated means for rotating the shaft.

4. In a headlight support, a two-winged hinge, one wing of the hinge being provided at the rear end with an adjusting screw engageable with the other wing and limiting the movement of the former wing in one direction and an adjusting bolt carried by the rear end of the other wing and passing slidably through the adjacent wing and provided with a head limiting the movement of the adjacent wing in the other direction.

Signed at Swift Current this 5th day of October, 1927.

GORDON C. GREEN.